US011693943B2

(12) United States Patent
Deluca et al.

(10) Patent No.: US 11,693,943 B2
(45) Date of Patent: Jul. 4, 2023

(54) AUTHENTICATING A USER VIA A CUSTOMIZED IMAGE-BASED CHALLENGE

(71) Applicant: INTERNATIONAL BUSINESS MACHINES CORPORATION, Armonk, NY (US)

(72) Inventors: Lisa Seacat Deluca, Baltimore, MD (US); Jeremy A. Greenberger, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 565 days.

(21) Appl. No.: 16/028,709

(22) Filed: Jul. 6, 2018

(65) Prior Publication Data

US 2020/0012776 A1  Jan. 9, 2020

(51) Int. Cl.
   *H04L 29/06* (2006.01)
   *G06F 21/36* (2013.01)
   *G06F 21/31* (2013.01)

(52) U.S. Cl.
   CPC .......... *G06F 21/36* (2013.01); *G06F 21/316* (2013.01); *G06F 2221/2103* (2013.01); *G06F 2221/2133* (2013.01)

(58) Field of Classification Search
   CPC .................. G06F 21/36; G06F 21/316; G06F 2221/2103; G06F 2221/2133
   See application file for complete search history.

(56) References Cited

U.S. PATENT DOCUMENTS

| 8,311,900 B1* | 11/2012 | Bates ............... G06F 16/972 |
| | | 705/27.2 |
| 8,732,089 B1* | 5/2014 | Fang ............... G06Q 20/389 |
| | | 705/76 |
| 8,904,493 B1* | 12/2014 | Dibble ............... H04L 63/08 |
| | | 726/4 |
| 9,105,034 B2 | 8/2015 | Hamilton, II et al. |
| 9,183,510 B1* | 11/2015 | Walti ............... G06Q 30/0269 |

(Continued)

OTHER PUBLICATIONS

Julian McAuley et al., Image-based Recommendations on Styles and Substitutes, Aug. 9, 2015, ACM, pp. 43-52. (Year: 2015).*

(Continued)

*Primary Examiner* — Luu T Pham
*Assistant Examiner* — Fahimeh Mohammadi
(74) *Attorney, Agent, or Firm* — Stephanie Carusillo; Andrew D. Wright; Calderon, Safran & Cole, P.C.

(57) ABSTRACT

Systems and methods for authenticating a user via a customized image-based challenge are disclosed. In embodiments, a computer-implemented method comprises: receiving an access request from a user requesting access to content; generating a list of items recommended for the user based on computer-based user behavior data; selecting from the list of recommended items: a first set of items and a second set of items, wherein the first set of items are associated with a characteristic and the second set of items are not associated with the characteristic; generating an image-based challenge comprising a test question to be answered by the user and a plurality of selectable images including images of each of the first set of items and images of each of the second set of items; and providing the image-based challenge to a user computer device of the user.

17 Claims, 4 Drawing Sheets

(56) References Cited

U.S. PATENT DOCUMENTS

| | | | |
|---|---|---|---|
| 9,710,841 B2* | 7/2017 | Ainsworth, III | G06Q 30/0643 |
| 2008/0162269 A1* | 7/2008 | Gilbert | G06Q 30/02 |
| | | | 705/7.31 |
| 2009/0012855 A1* | 1/2009 | Jamal | G06Q 30/0241 |
| | | | 705/14.4 |
| 2009/0018926 A1* | 1/2009 | Buehlman | G06Q 30/0643 |
| | | | 705/26.81 |
| 2009/0204819 A1 | 8/2009 | Parker | |
| 2009/0210937 A1 | 8/2009 | Kraft et al. | |
| 2009/0249477 A1 | 10/2009 | Punera | |
| 2010/0191619 A1* | 7/2010 | Dicker | G06Q 30/0603 |
| | | | 705/26.1 |
| 2011/0066497 A1* | 3/2011 | Gopinath | G06Q 30/0255 |
| | | | 705/14.53 |
| 2011/0173078 A1* | 7/2011 | Hicks | G06N 5/02 |
| | | | 705/14.66 |
| 2013/0035996 A1* | 2/2013 | Frey | G06Q 30/02 |
| | | | 705/14.4 |
| 2013/0145441 A1* | 6/2013 | Mujumdar | G06F 21/305 |
| | | | 726/5 |
| 2013/0298195 A1* | 11/2013 | Liu | G06T 11/60 |
| | | | 726/3 |
| 2014/0289828 A1* | 9/2014 | Gross | G07F 17/3241 |
| | | | 726/6 |
| 2015/0016699 A1* | 1/2015 | Ritt | G06K 9/6227 |
| | | | 382/128 |
| 2015/0113598 A1* | 4/2015 | Carbonell Duque | H04M 3/38 |
| | | | 726/3 |
| 2016/0063597 A1* | 3/2016 | Goulart | G06Q 50/01 |
| | | | 705/26.7 |
| 2016/0210674 A1* | 7/2016 | Allen | G06Q 30/0635 |
| 2017/0235968 A1* | 8/2017 | Kishi | G06F 16/532 |
| | | | 707/781 |
| 2019/0197598 A1* | 6/2019 | Guo | G06Q 30/0631 |

OTHER PUBLICATIONS

Wenhui Yu et al., Aesthetic-based Clothing Recommendation, Apr. 23, 2018, ACM, pp. 649-658. (Year: 2018).*

Nan Jiang et al., A Gesture-based CAPTCHA Design Supporting Mobile Devices, Jul. 13, 2015, ACM, pp. 202-207. (Year: 2015 ).*

Shardul Vikram et al., SEMAGE: A New Image-based Two-Factor CAPTCHA, Dec. 5, 2011, ACM, pp. 237-246. (Year: 2011).*

Aggarwal, "Animated CAPTCHAs and Games for Advertising", WWW '13 Companion Proceedings of the 22nd International Conference on World Wide Web, pp. 1167-1174, Rio de Janeiro, Brazil, May 13-17, 2013 ACM New York, NY, 8 pages.

Aïmeur et al., "Blind sales in electronic commerce," ICEC '04 Proceedings of the 6th international conference on Electronic commerce, pp. 148-157, Jan. 2004,10 pages.

Chand, "Method and System for Offering an Advertisement as a CAPTCHA challenge", Ip.com Disclosure No. IPCOM000206568D, Apr. 29, 2016, 8 pages.

Anonymous, "An intelligent method and system to display CAPTCHA to people," Ip.com Disclosure No. PCOM000248706D, Dec. 28, 2016, 3 pages.

Basso, "Protecting Web resources from massive automated access," University of Torino, Technical RT114/08 (2008), https://pdfs.semanticscholar.org/90ee/6011272c7f5aafa9e8474db2b2feb73e4557.pdf, 2008, 57 pages.

Anonymous, "Confident Advertising Image-Based Captcha Authentication Solution", http://confidenttechnologies.com/confident-advertising/, accessed May 3, 2018, 2 pages.

DeLuca, "Machine learning, product recommendations, and IoT... Oh my!", https://developer.IBM.com/dwblog/2017/machine-learning-mahout-recommendation-engine-iot/, May 23, 2017, 3 pages.

Anonymous, "Confident CAPTCHA—Image based CAPTCHA and brand advertising platform", Youtube, https://www.youtube.com/watch?v=NbqH_0SOneg , Published Sep. 26, 2012,1 page.

* cited by examiner

AUTHENTICATING A USER VIA A CUSTOMIZED IMAGE-BASED CHALLENGE

BACKGROUND

The present invention relates generally to computer-based authentication of users and, more particularly, to authentication of users via customized image-based challenges.

A CAPTCHA is an acronym for "Completely Automated Public Turing test to tell Computers and Humans Apart". A CAPTCHA is a test or challenge designed to confirm that an entity attempting to access content (e.g., a website) is a human. CAPTCHA may be in the form of a distorted image of letters, symbols and/or numbers, or may be in the form of an image-based challenge comprising a plurality of user-selectable images. Image-based CAPTCHA may present a plurality of user-selectable images to a user with a challenge question, such as "select all images including the color blue". Once a user selects the appropriate image or combination of images in an image-based CAPTCHA, a computer device enables the user to access the user's target content or destination (e.g., website). Some attempts have been made to leverage the time a user spends on CAPTCHA to sell advertising space in and around CAPTCHA.

SUMMARY

In an aspect of the invention, a computer-implemented method includes: receiving, by the computing device, an access request from a user requesting access to content; generating, by a computing device, a list of items recommended for the user based on computer-based user behavior data; selecting, by the computing device, from the list of recommended items: a first set of items and a second set of items, wherein the first set of items are associated with a characteristic and the second set of items are not associated with the characteristic; generating, by the computing device, an image-based challenge comprising a test question to be answered by the user and a plurality of selectable images including images of each of the first set of items and images of each of the second set of items; and providing, by the computing device, the image-based challenge to a user computer device of the user.

In another aspect of the invention, there is a computer program product for authenticating a user via a customized image-based challenge. The computer program product comprises a computer readable storage medium having program instructions embodied therewith. The program instructions are executable by a computing device to cause the computing device to: receive an access request from a user requesting access to content; generate a list of items recommended for the user based on computer-based user behavior data; determine a shared characteristic for a first set of items of the list of items; generate an image-based challenge comprising a test question to be answered by the user and a plurality of selectable images including images of each of the first set of items and images of a second set of items, wherein the second set of items do not include the shared characteristic and the test question is based on the shared characteristic; and provide the image-based challenge to a user computer device of the user.

In another aspect of the invention, there is a system for authenticating a user via a customized image-based challenge. The system includes a CPU, a computer readable memory and a computer readable storage medium associated with a computing device; program instructions to receive an access request from a user requesting access to content; program instructions to generate a list of items recommended for the user based on computer-based user behavior data; program instructions to generate, based on the list of items recommended for the user, an image-based challenge including a test question to be answered by the user and a plurality of selectable images, wherein the plurality of selectable images comprise a first set of items associated with a shared characteristic, and a second set of items not associated with the shared characteristic, and wherein an answer to the test question is based on the shared characteristic; and program instructions to provide the image-based challenge to a user computer device of the user, wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
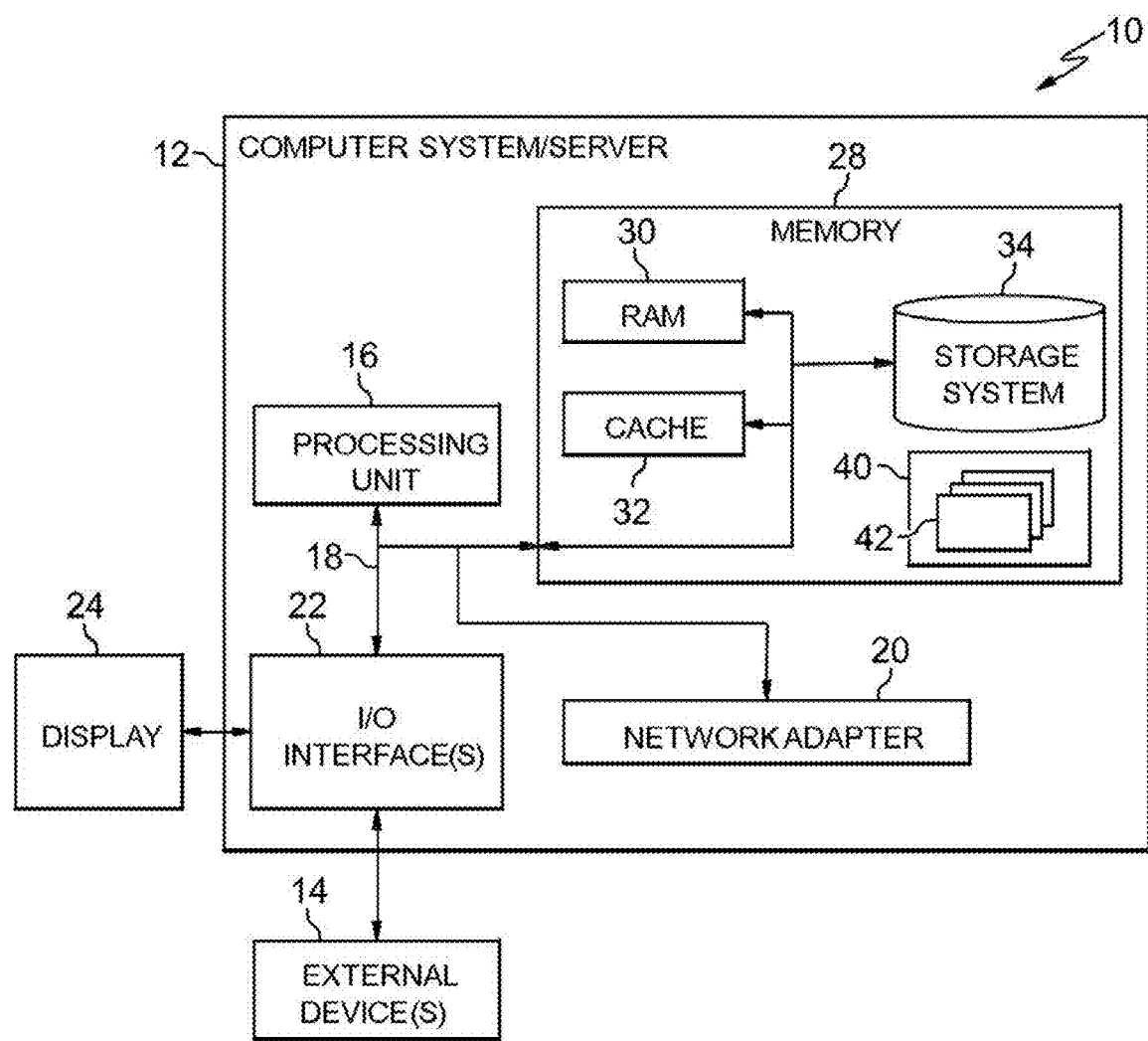
FIG. 1 depicts a computing infrastructure according to an embodiment of the present invention.

The present invention relates generally to computer-based authentication of users and, more particularly, to authentication of users via customized image-based challenges or tests. In embodiments, a system is provided to drive a retail based Completely Automated Public Turing test to tell Computers and Humans Apart (CAPTCHA) based on user-specific product recommendations for upsell and cross sell opportunities. In embodiments, a system determines a user's preferences through session cookies, user identifier/username data, an email address, Internet Protocol (IP) address association, real-time user behaviors or other indicators of user preferences. A recommendation module utilizes the user's preferences to generate a list of items (e.g., items available for purchase) that may be recommended to the user. In aspects, the system analyzing image tags or image data associated with the images to identify shared characteristics between the images (e.g., a common category that applies to two or more of the images). In embodiments, the system generates a CAPTCHA based on the list of items, including a first set of images having a shared characteristic (e.g., a common category that applies to the first set of images), and a second set of images that do not have the shared characteristic. In aspects, the system determines a CAPTCHA question based on the shared characteristics between the first set of images. The CAPTCHA may enable a user to select one or more images to answer the CAPTCHA question, and to additionally select one or more images based on the user's desire for more information regarding the items depicted within the CAPTCHA itself. In aspects, the system determines that the user has indicated an interest in one or more items depicted and initiates an action such as adding the item to the user's shopping cart, flagging the item for future marketing events, or displaying additional information about the item to the user.

Advantageously, embodiments of the present invention provide added functionality to computer CAPTCHA systems by enabling such systems to generate image-based CAPTCHAs customized to individual users. In this way, a customized CAPTCHA may be generated comprising a plurality of images likely to be of interest to a particular user (e.g., items for sale). Additionally, embodiments of the invention enable a system to gather both an answer to a CAPTCHA question, and user-preference data through a user's interaction with an image-based CAPTCHA. For example, through a CAPTCHA of the present invention, a user may indicate an interest in one or more items for sale shown in the image-based CAPTCHA, thereby enabling additional system functionality such as automatically adding items depicted in the CAPTCHA to a digital shopping cart, automatically flagging items for future marketing events associated with the user, and generating customized real-time advertisements or marketing events.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
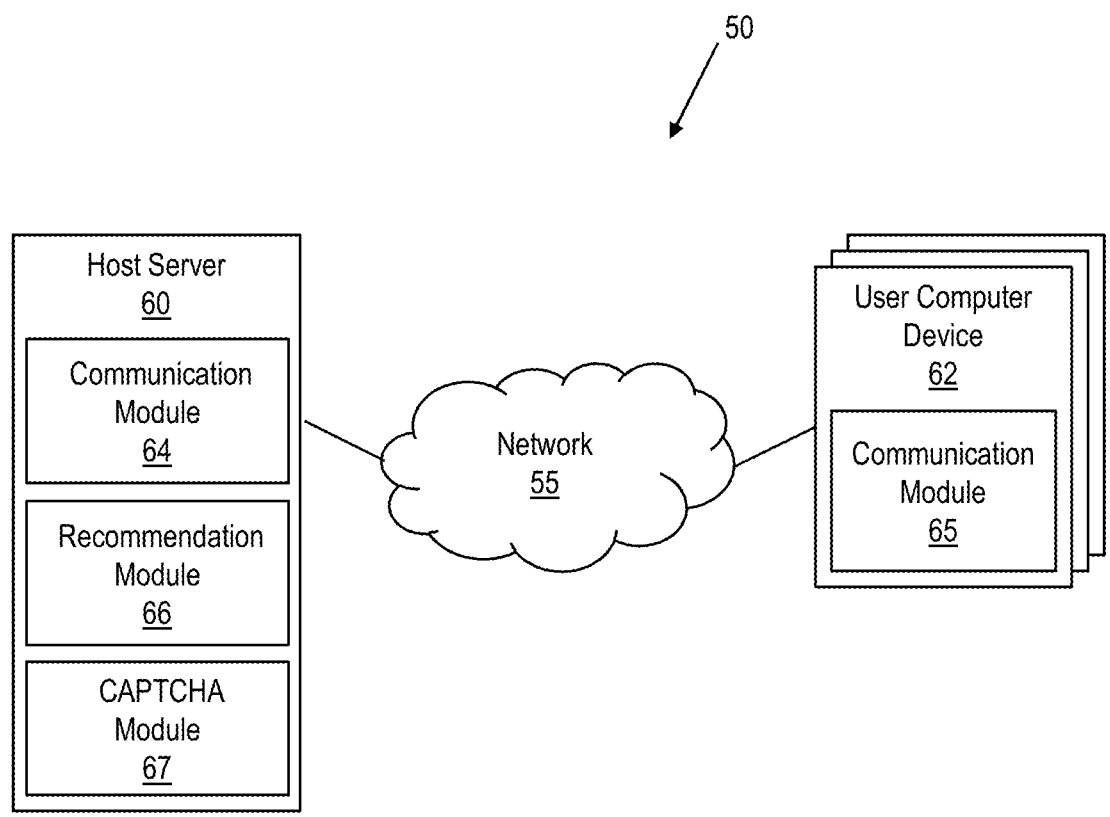
FIG. 2 shows an exemplary environment in accordance with aspects of the invention.

FIG. 2 shows an exemplary CAPTCHA environment 50 in accordance with aspects of the invention. The CAPTCHA environment 50 includes a network 55 connecting a host server 60 to one or more user computer devices 62. The host server 60 may comprise a computer system 12 of FIG. 1, and may be connected to the network 55 via the network adapter 20 of FIG. 1. The host server 60 may be configured as a special purpose computing device that is part of a content provider infrastructure. For example, the host server 60 may be configured to receive access requests from one or more user computer devices 62, provide a CAPTCHA to the one or more user computer devices 62 for security purposes, verify the user is human through receipt of a correct answer to the CAPTCHA, and provide content to the one or more user computer devices 62 based on the access request and verification. The host server 60 may be configured to communicate with a plural different user computer devices 62 simultaneously, and perform access request processing and CAPTCHA verification separately for each user computer device 62 independent of the others.

The network 55 may be any suitable communication network or combination of networks, such as a local area network (LAN), a general wide area network (WAN), and/or a public network (e.g., the Internet). The user computer device 62 may be in the form of the computer system 12, and may be a desktop computer, laptop computer, tablet computer, smartphone, etc. In embodiments, the user computer device 62 runs a browser application program that provides an interface (e.g., a web page) by which a user may enter (e.g., type) an access request to be submitted to the host server 60.

Still referring to FIG. 2, the host server 60 may include a plurality of modules configure to perform one or more functions described herein, wherein each module may include one or more program modules (e.g., program module 42 of FIG. 1) executed by the host server 60. In embodiments, the host server 60 includes a communication module 64 configured to communicate with one or more communication modules 65 of respective user computer devices 62. For example, the host server 60 may enable the user computer devices 62 to access content such as a website, through the communication module 64.

In embodiments, the host server 60 comprises a recommendation module 66 configured to generate a list of recommended items for a user based on historic or real-time user behavior data (e.g., session cookies, IP address association, real-time user behaviors, etc.). The list of recommended items may be items for sale that the recommendation module 66 determines the user may be interested in purchasing. In aspects, the list of recommended items may include items associated with a website that is hosted by the host server 60. In embodiments, the recommendation module 66 utilizes cross co-occurrence (CCO) matrices generated from a plurality of user behavior data to determine the list of recommended items. The recommendation module 66 may be incorporated into the host server 60 as depicted in FIG. 2, or may be in the form of a separate computing device communicating with the host server 60 via the network 55.

In aspects, the host server 60 comprises a CAPTCHA module 67 configured to generate a challenge in the form of an image-based CAPTCHA customized for a particular user. In embodiments, the CAPTCHA module 67 is further configured to determine a first set of images having a shared characteristic (e.g., all items are earrings), and a second set of images that do not have the shared characteristic. The CAPTCHA module 67 may utilize the recommended items from the recommendation module 66 to generate the image-based CAPTCHA including the first set of images and the second set of images, and then generate a CAPTCHA test question based on the shared characteristic (e.g., "Which items are earrings?"). The CAPTCHA module 67 may be incorporated into the host server 60 as depicted in FIG. 2, or may be in the form of a separate computing device communicating with the host server 60 via the network 55.

In embodiments, the CAPTCHA environment 50 may include additional or fewer components than those shown in FIG. 2. In embodiments, separate components (e.g., recommendation module 66, CAPTCHA module 67) may be integrated into a single computing component or module. Additionally, or alternatively, a single component may be implemented as multiple computing components or modules.

Figure 3:
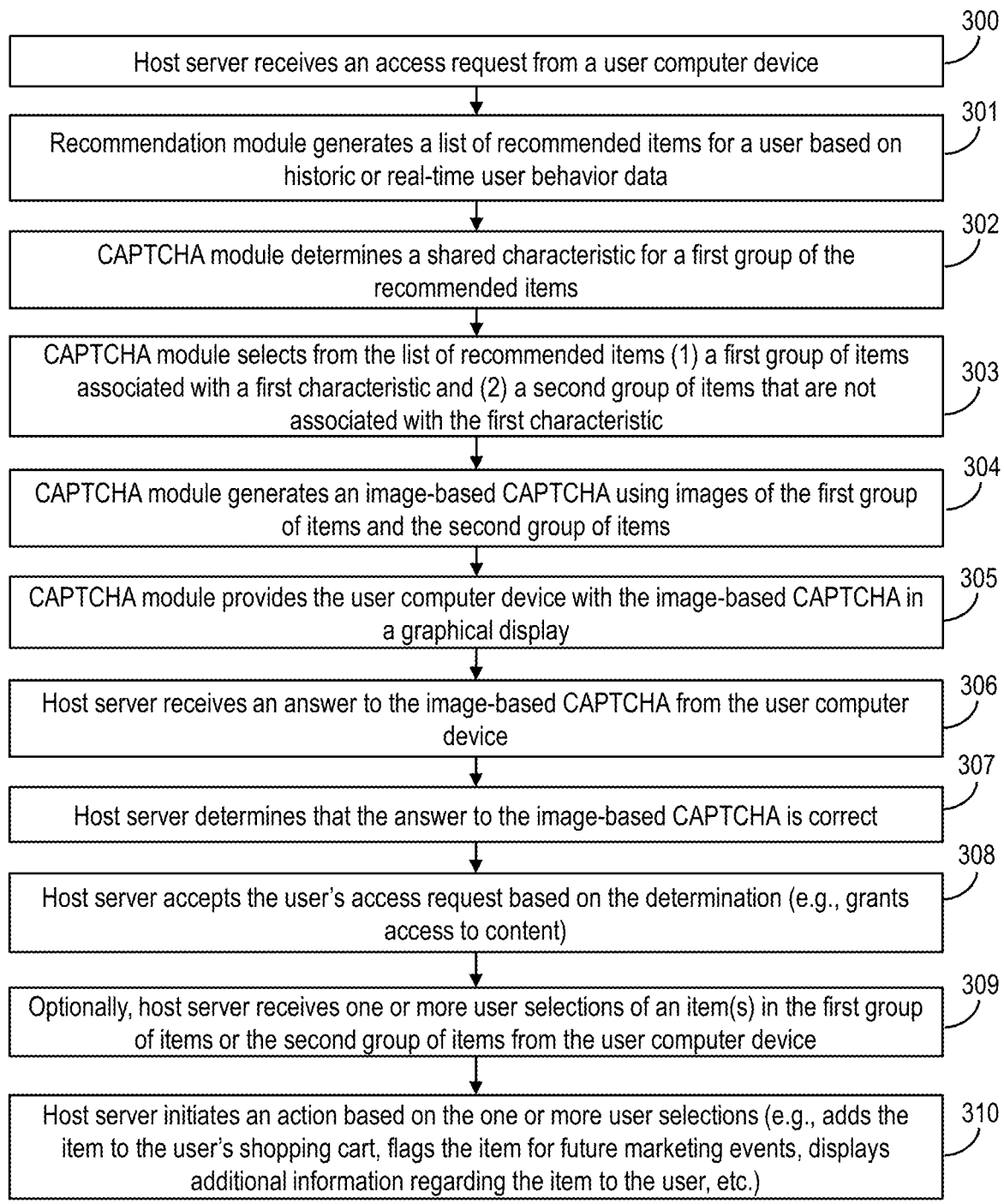
FIG. 3 shows a flowchart of steps of a method in accordance with aspects of the invention.

FIG. 3 a flowchart of a method in accordance with aspects of the invention. Steps of the method of FIG. 3 may be performed in the environment illustrated in FIG. 2, and are described with reference to elements shown in FIG. 2.

At step 300 the host server 60 receives an access request from a user computer device 62. The term access request as used herein refers to a request to access content, such as a website. In embodiments, the communication module 64 of the host server 60 receives the access request from the communication module 65 of the user computer device 62. Existing access request tools and methods may be utilized in the performance of step 300.

At step 301, the recommendation module 66 generates a list of recommended items for the user requesting access at step 300, based on historic or real-time user behavior data. In embodiments, the recommendation module 66 receives a user identifier (e.g., user login or other means of identifying a specific user) associated with the access request, and utilizes the user identifier to generate the list of recommended items for the user, based on historic data from one or more users of the host server 60 and/or real-time user data from one or more users of the host server 60. In embodiments, the recommendation module 66 does not require a user identifier, but instead utilizes behavior data associated with the user to determine the list of recommended items (e.g. session cookies, IP address association, real-time user behaviors, etc.). The list of recommended items may be in the form of images of respective recommended items (e.g., items for sale), links to images of the respective recommended items, or a list of identifying information enabling the CAPTCHA module 67 to obtain images of each of the recommended items.

In embodiments, the recommendation module 66 utilizes one or more cross co-occurrence (CCO) matrices to generate a list of recommended items that are statistically likely to be of interest to a user. As used herein, the term CCO matrix refers to a matrix developed by dynamically processing n-number of user behavior factors (user behavior data) as input, wherein the matrix indicates a likelihood that two or more events will be performed together. For example, a CCO matrix may indicated that users who purchased a product X will often purchase a product Y. One example of a CCO tool for use with the present invention is an Apache Mahout™ CCO algorithm. In aspects, a list of events (user behavior factors) obtained by the host server 60 for a plurality of users are utilized to generate a CCO matrix. The list of events may be obtained locally or from a remote source. An example of user behavior data that may be utilized by the host server 60 to generate a CCO matrix are provided in the Table below.

TABLE

Exemplary CCO Matrix Input

| User | Description | Item |
| --- | --- | --- |
| Anonymous X | View | Product 123 |
| Anonymous X | Like | Product 123 |
| Anonymous X | View | Product ABC |
| Anonymous X | Dislike | Product ABC |
| Anonymous X | Category | Shorts |
| Anonymous X | Color preference | Blue |
| Anonymous X | City | Austin |
| Anonymous X | State | Texas |
| Anonymous X | Abandon | Product ABC |

The host server 60 may apply one or more filters to preliminary recommendation data to obtain a final list of recommended items. For example, the preliminary list of recommended items may be determined based on a CCO matrix, and the host server 60 may apply further filters to narrow down the results, such as products on sale, availability of the product(s) near the user (e.g., based on the user's zip code), etc. In embodiments, step 301 is initiated upon receipt of the access request at step 300.

At step 302, the CAPTCHA module 67 determines a shared characteristic for a first group of the recommended items from step 301. Shared characteristics may be any characteristic that may be utilized in a CAPTCHA to distinguish the first group of recommended items from a second group of recommended items. For example, a shared characteristic may be a common color, a common background (e.g., blue background, floral pattern, etc.), a common category of item (e.g., earrings, sunglasses, etc.). In embodiments, the CAPTCHA module 67 identifies shared characteristics using information associated with images of the items, such as image tags, or the like. For example, image tags associated with a plurality of recommended item images may indicated that the images all relate to "earrings". In aspects, the CAPTCHA module 67 may utilize image recognition tools to process images of the recommended items to determine the shared characteristics (e.g., determine image tags to associate with the images). Existing image processing tools may be utilized in the implementation of step 302. It should be understood that CAPTCHA module 67 may determine more than one shared characteristic for respective groups of images. For example, the CAPTCHA module 67 may identify a first group of item images showing earrings and a second group of item images showing sunglasses. For the simplicities sake, only one determined shared characteristic is referenced in the following steps of FIG. 3.

At step 303, the CAPTCHA module 67 selects from the list of recommended items: a first group of items from the list of recommended items, which are associated with the shared characteristic identified at step 302; and a second group of items from the list of recommended items, which are not associated with the shared characteristic identified at step 302. For example, the CAPTCHA module 67 may determine a first group of recommended items based on the overlapping tag category "sunglasses", wherein the images of the first group of recommended items each depict sunglasses while images of the second group of recommended items do not depict sunglasses. The total number of images selected by the CAPTCHA module 67 for inclusion in a CAPTCHA may vary. In one example, the CAPTCHA module 67 selects a total of six (6) images of recommended items, which are divided up (evenly or unevenly) between the first group of items and the second group of items. In embodiments, one or more of the first group of items and the second group of items are selected based on the type of content that the user is attempting to access (e.g., a retail website). For example, if the user is attempting to access a jewelry retailer, the host server 60 may select a plurality of images for inclusion in the CAPTCHA based on jewelry items for sale by the jewelry retailer.

At step 304, the CAPTCHA module 67 generate an image-based CAPTCHA using the images from the first group of items and images from the second group of items selected at step 303. In aspects, the CAPTCHA includes a test question related to the shared characteristic of the first group of items determined at step 302. For example, the test question may state "Select all of the sunglasses." The CAPTCHA generated in accordance with step 304 may include additional information, such as instructional information guiding a user's actions. In embodiments, the images in the CAPTCHA are in the form of user-selectable icons. The CAPTCHA may utilize various method for highlighting selected images, such as colors, symbols, shading, or other means for indicating a user selection. The CAPTCHA may include a selectable icon for entering an answer to the test question, such as a "Verify" button, "Enter" button, or the like. In embodiments, the CAPTCHA includes one or more means for enabling a user to select images for purposes other than answering the test question, such as a secondary icon that a user can select to obtain additional information about the item. Images of the CAPTCHA may be accompanied by item information, including price, availability, discounts or offers, or product description, for example. In aspects, one or more of the images presented by the CAPTCHA are products for sale. In embodiments, the CAPTCHA module 67 stores an answer to the test question in a memory of the host server 60. In aspects, the answer to the question is a set of predetermined image selections, wherein the images to be selected are all of the images of the first set of items.

At step 305, the CAPTCHA module 67 provides the image-based CAPTCHA generated at step 304 to the user computer device 62 based on the access request received at step 300. In embodiments, the CAPTCHA module 67 may provide the image-based CAPTCHA to the user computer device 62 through communication of the communication module 64 of the host server 60 with the communication module 65 of the user computer device 62.

At step 306, the host server 60 receives an answer to the test question of the CAPTCHA from the user computer device 62. The communication module 64 of the host server 60 may receive the answer and pass the answer to the CAPTCHA module 67 of the host server 60 for verification. The answer may be in the form of a plurality of icon or image selections.

At step 307, the host server 60 determines that the answered received at step 306 is correct. In embodiments, the CAPTCHA module 67 performs step 307. For example, the CAPTCHA module 67 may compare images selected by the user (i.e., the answer to the test question) with a predetermined set of images to be selected (e.g., all images of the first set of items), and may determine that the images selected by the user and received at step 306 match the predetermined set of images to be selected.

At step 308, the host server 60 accepts the user's access request based on the determination at step 307 that the test question was answered correctly by the user, and grants the user access to requested content (e.g., a website). If the host server 60 does not determine that the answer received at step 306 is correct, the access request will be denied (not shown in FIG. 3). Various methods and tools for accepting an access request may be utilized in the implementation of step 308. For example, the host server 60 may present the user of the user computer device 62 with a website or new window based on the access request of step 300.

At step 309, the host server 60 optionally receives one or more secondary user selections of images and/or items shown in the images of the CAPTCHA that are not associated with the answer to the test question. For example, the host server 60 may receive a selection of one or more secondary icons indicating that the user is interested in one or more items depicted within the CAPTCHA. The host server 60 may receive this secondary icon selection with the answer to the test question at step 306. In embodiments, the CAPTCHA module 67 of the host server 60 receives the one or more secondary user selections in accordance with step 309.

At step 310, the host server 60 initiates an action based on the one or more secondary user selections of step 309. In embodiments, the CAPTCHA module 67 performs step 310. The action may be an automatic marketing or advertising action based on the secondary user selections of the user. Actions may include, for example, automatically adding one or more selected items to a user's digital shopping cart, automatically flagging one or more selected items for future marketing events, and/or automatically displaying additional information regarding one or more selected items to the user. In aspects, the one or more items may be added to the user's digital shopping cart automatically when the user accesses the requested content (e.g., accesses a retail website including the digital shopping cart). The automatic displaying of additional information to the user may occur in real time with the selection of the secondary icons or may occur when the user accesses the requested content (e.g., a website).

Figure 4:
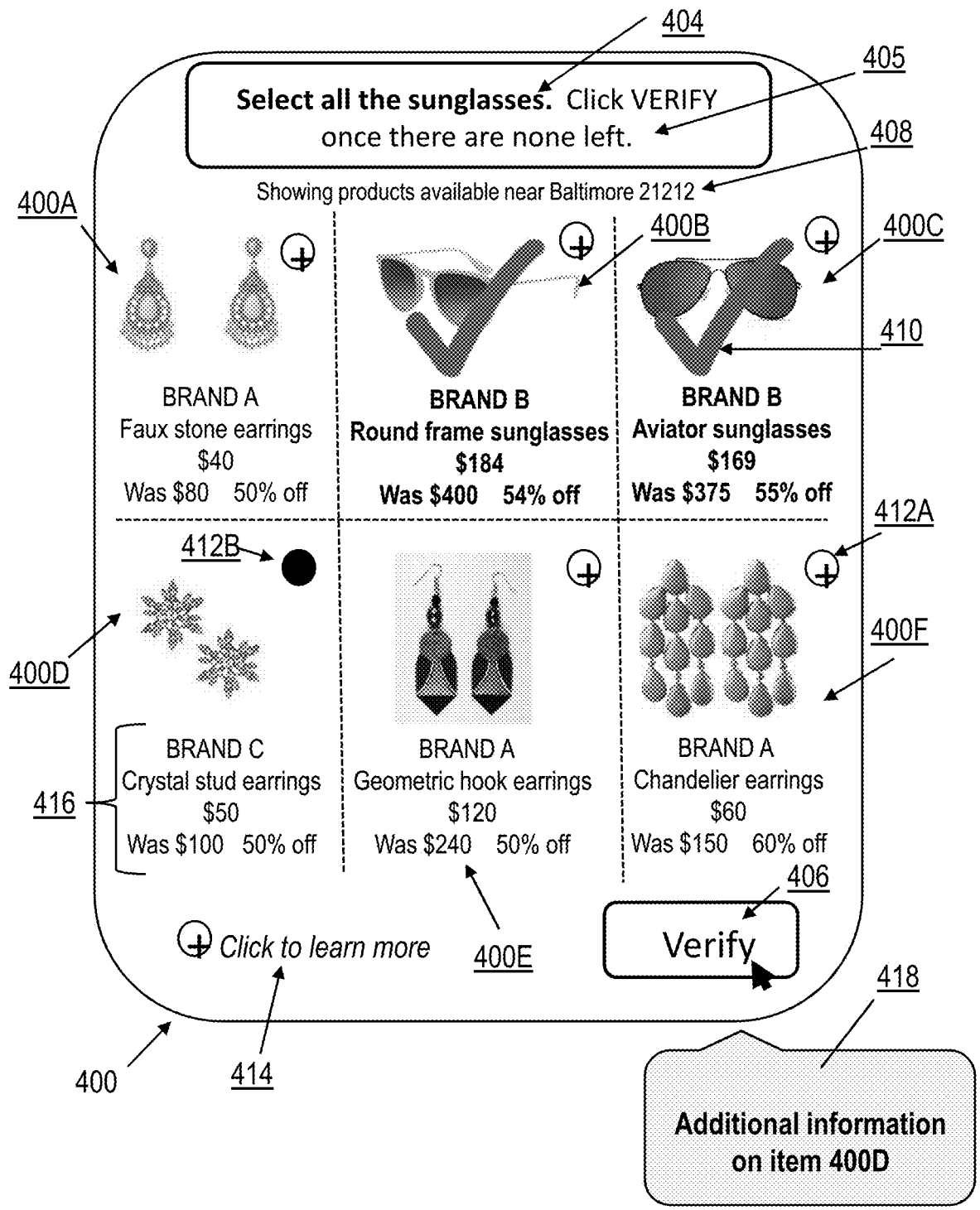
FIG. 4 shows an exemplary image-based challenge in accordance with embodiments of the invention.

FIG. 4 depicts an exemplary image-based challenge generated in accordance with embodiments of the invention. The challenge of FIG. 4 may be generated based on the steps of FIG. 3.

An exemplary image-based challenge in the form of a CAPTCHA 400 is depicted in FIG. 4, and is designed to confirm that an entity attempting to access content (e.g., a website) is a human. CAPTCHA 400 includes a plurality of images 402A-402F, which are images of items from the list of recommended items generated at step 301 of FIG. 3. In this example, the CAPTCHA 400 is generated with a first group of items (images 402B and 400C) associated with a shared characteristic "sunglasses", determined in accordance with step 302 of FIG. 3, and a second group of items (images 400A, 400D, 400E, 400F) not associated with the shared characteristic "sunglasses". The CAPTCHA 400 is further generated with the test question 404 "Select all the sunglasses". Additional instructional information 405 is included in the CAPTCHA 400, including the instructions "Click VERIFY once there are none left". An answer submission icon in the form of a "Verify" button is shown at 406. In this example, the host server 60 determined the images to use in the CAPTCHA 400 based in part on a filter for products available near the user, which is represented by the filter indicator 408 "Showing products available near Baltimore 21212". The images 402A-402F are presented as a series of selectable icons, wherein selecting the icon results in a visual selection indicator 410 in the form of a check mark. Moreover, each image 402A-402F is associated with a secondary icon 412A shown in FIG. 4 as a selectable circle icon. In this example, instructional information is presented at 414 indicating that a user should click the secondary icon 412A to learn more. A selected secondary icon is depicted at 412B. The CAPTCHA 400 of FIG. 4 is further provided with product information indicated at 416, wherein the product information 416 includes a brand name, an item description, a price of the item and price discount information.

With continued reference to FIG. 4, a user's answer to the CAPTCHA test question 404 is shown in the form of selected image icons 400B and 400C. In the example of FIG. 4, the user has also selected the secondary icon 412B, indicating that they are interested in learning more about the item depicted in image 400D. Once a user clicks on the answer submission icon 406, the host server 60 will receive the users answer in accordance with step 306 of FIG. 3, and will determine that the answer is correct in accordance with step 307 of FIG. 3. The host server 60 will accept the user's access request based on the determination that the answer is correct, and the user will be presented with additional information regarding item 400D in accordance with step 310 of FIG. 3. The presentation of additional information according to step 310 may be conducted before, during or after the user is granted access to content in accordance with step 308 of FIG. 4. In embodiments, the host server 60 automatically presents additional information to the user when the host server 60 determines that the user has selected the secondary icon 412D. In this example, the additional information is presented to the user in the form of a pop-up object 418. In the example of FIG. 4, the host server 60 also automatically flags the item in the image 400D as an item of interest for future marketing events. Accordingly, the host server 60 may thereafter automatically present the user with notifications regarding the item in image 400D, or conduct other marketing events including the item of image 400D.

Based on the above, it should be understood that a customized CAPTCHA 400 may be generated for a user based on information associated with the user (historic or real-time user data), wherein images in the CAPTCHA are determined to be relevant to the specific user receiving the CAPTCHA. Moreover, the customized CAPTCHA 400 of the present invention enables a user to access additional information regarding items of interest to the user (e.g., 400D), and enables a host server 60 to automatically conduct additional sales and/or marketing functions based on information generated by the CAPTCHA 400.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for authenticating a user via a customized image-based challenge. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by a computing device, an access request from a user requesting access to content;
customizing, by the computing device, an image-based challenge for the user prior to the user accessing the content by:
generating, by the computing device, a list of items recommended for the user based on historic computer-based user behavior data, wherein the computing device chooses from images of items in the list of items when generating customized image-based challenges;
filtering, by the computing device, the list of items based on a type of the content to which access was requested in the access request, thereby generating a filtered list of items;
determining, by the computing device, for the purpose of generating a customized image-based challenge, a shared characteristic of a subset of the filtered list of items utilizing image recognition tools to process the images of items in the filtered list of items, thereby generating a first set of items associated with the shared characteristic;
selecting, by the computing device, from the filtered list of items a second set of items for the purpose of generating the customized image-based challenge, wherein the first set of items are associated with the shared characteristic and the second set of items are not associated with the shared characteristic; and
generating, by the computing device, the customized image-based challenge comprising a test question to be answered by the user and a plurality of selectable images including images of each of the first set of items and images of each of the second set of items; and
providing, by the computing device, the customized image-based challenge to a user computer device of the user,
wherein the customized image-based challenge further comprises, for each item in the customized image-based challenge, one or more of the group consisting of: an item description, a sales price, and special offers.

2. The method of claim 1, wherein the list of items recommended for the user is generated based on one or more of the group consisting of: session cookies, Internet Protocol (IP) address association, a username, and an email address.

3. The method of claim 1, further comprising:
obtaining, by the computing device, an answer to the test question from the user computer device in the form of user-selected images;
determining, by the computing device, that the answer is a correct answer; and
enabling, by the computing device, the user computer device to access the content based on the determining that the answer is correct.

4. The method of claim 1, wherein the customized image-based challenge further comprises a plurality of selectable secondary icons associated with the plurality of images and presented with the customized image-based challenge for enabling the user to select one or more of the first set of items and the second set of items for a purpose other than answering the test question.

5. The method of claim 4, further comprising:
receiving, by the computing device, a user selection of one or more of the plurality of secondary icons; and
automatically initiating, by the computing device, an action based on the received user selection.

6. The method of claim 5, wherein the action comprises automatically adding one or more of the first set of items and the second set of items to a digital shopping cart.

7. The method of claim 1, wherein:
the access request is received from a remote user computer device,
the generating the list of items recommended for the user is initiated based on the receipt of the access request by the computing device, and
the user is not granted access to the content prior to receiving, from the user, a correct answer to the test question of the customized image-based challenge.

8. A computer program product for authenticating a user via a customized image-based challenge, the computer program product comprising a computer readable storage medium having program instructions embodied therewith, the program instructions executable by a computing device to cause the computing device to:
receive an access request from a user requesting access to content;
generate a list of items recommended for the user, based on computer-based historic user behavior data for a plurality of users;
generate a customized image-based challenge comprising a test question to be answered by the user and a plurality of selectable images including images of each of a first set of items including shared characteristics and images of a second set of items, wherein the second set of items do not include the shared characteristic and the test question is based on the shared characteristic;
provide the customized image-based challenge to a user computer device of the user;
receive a user selection of one of a plurality of secondary icons in the customized image-based challenge associated with the plurality of selectable images, wherein the plurality of secondary icons enable the user to obtain information regarding the one or more of the first set of items or the second set of items for a purpose other than answering the test question; and
in response to enabling the user computer device to access the content based on receiving a correct answer to the customized image-based challenge, display to the user the information regarding the one or more of the first set of items or the second set of items based on the user selection of the one of a plurality of secondary icons,
wherein the customized image-based challenge further comprises, for each item in the customized image-based challenge, one or more of the group consisting of: an item description, a sales price, and special offers.

9. The computer program product of claim 8, wherein the access request is a request to access a website, and the plurality of selectable images comprise images of one or more items for sale through the website.

10. The computer program product of claim 8, wherein:
the determining the shared characteristic comprises utilizing image recognition tools to process images of items in the list of items to determine the shared characteristic of the items; and;
the program instructions further cause the computing device to:
obtain the correct answer to the test question from the user computer device in the form of user-selected images; and
determine that the user-selected images match predetermined images to be selected and is therefore the correct answer to the customized image-based challenge.

11. The computer program product of claim 8, wherein the program instructions further cause the computing device to:
   receive a user selection of one or more of the plurality of secondary icons; and
   automatically initiate an action based on the received user selection.

12. The computer program product of claim 11, wherein the action is selected from the group consisting of: adding one or more of the first set of items and the second set of items to a digital shopping cart, and flagging the one or more of the first set of items and the second set of items.

13. A system for authenticating a user via a customized image-based challenge, comprising:
   a CPU, a computer readable memory and a computer readable storage medium associated with a computing device;
   program instructions to receive an access request from a user requesting access to content;
   program instructions to generate a list of items recommended for the user in response to the access request based on computer-based user behavior data, wherein the computing device chooses from images of items in the list of items when generating customized image-based challenges;
   program instructions to filter the list of items recommended for the user based on a type of the content to be accessed by the user, thereby generating a filtered list of items;
   program instructions to determine shared characteristics of a subset of the filtered list of items recommended for the user, thereby generating a first set of items associated with the shared characteristic;
   program instructions to generate, based on the filtered list of items recommended for the user, a customized image-based challenge including a test question to be answered by the user and a plurality of selectable images, wherein the plurality of selectable images comprise the first set of items associated with the shared characteristic, and a second set of items not associated with the shared characteristic, and wherein an answer to the test question is based on the shared characteristic; and
   program instructions to provide the customized image-based challenge to a user computer device of the user,
   wherein the program instructions are stored on the computer readable storage medium for execution by the CPU via the computer readable memory,
   wherein the customized image-based challenge further comprises, for each item in the customized image-based challenge, one or more of the group consisting of: an item description, a sales price, and special offers.

14. The system of claim 13, further comprising:
   program instructions to determine the shared characteristic for the first set of items based on one of image tags and image recognition techniques.

15. The system of claim 13, further comprising:
   program instructions to obtain the answer to the test question from the user computer device in the form of user-selected images;
   program instructions to determine that the user-selected images match predetermined images to be selected; and
   program instructions to enable the user computer device to access the content based on the determining that the user-selected images match the predetermined images to be selected.

16. The system of claim 13, wherein the customized image-based challenge further comprises a plurality of secondary icons associated with respective ones of the plurality of images for enabling the user to select one or more of the first set of items and the second set of items for a purpose of providing additional information regarding items for sale shown in the plurality of images.

17. The system of claim 16, further comprising:
   program instructions to receive a user selection of one or more of the plurality of secondary icons; and
   program instructions to automatically initiate a computer-based action based on the received user selection in response to enabling the user to access the content after receiving a correct answer to the test questions from the user.

* * * * *